Sept. 4, 1956 R. L. ATKINSON 2,761,745
ENDLESS TRACKS FOR SELF-LAYING TRACK TYPE VEHICLES
Filed Jan. 11, 1954 4 Sheets-Sheet 1

Inventor
Richard Leslie Atkinson
By
Richardson, David and Nordon
his Attorneys

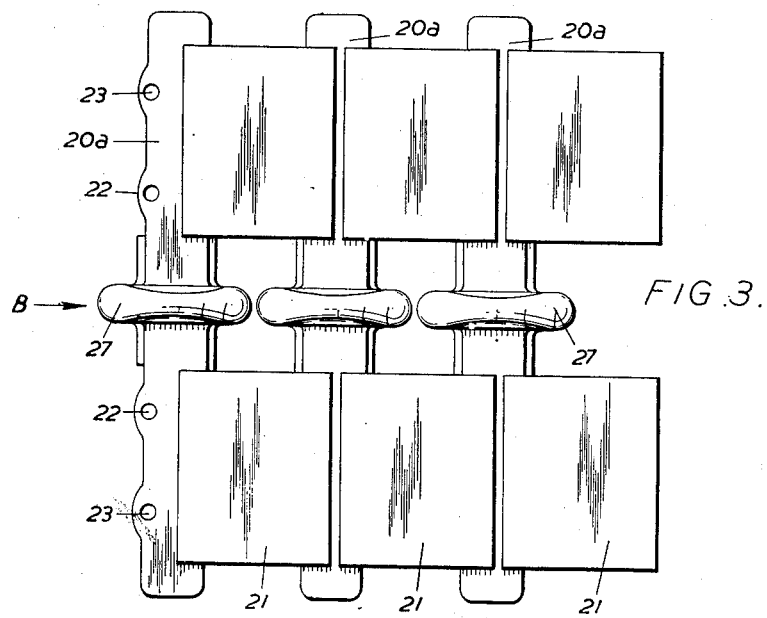
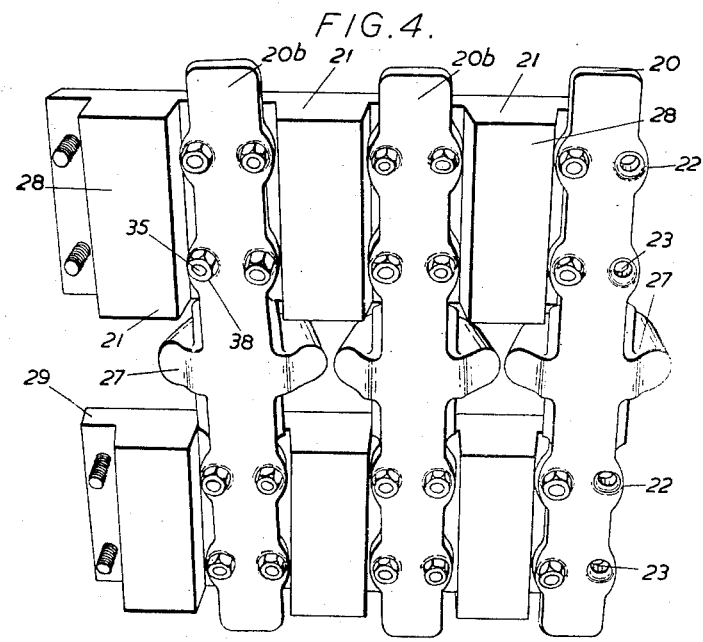

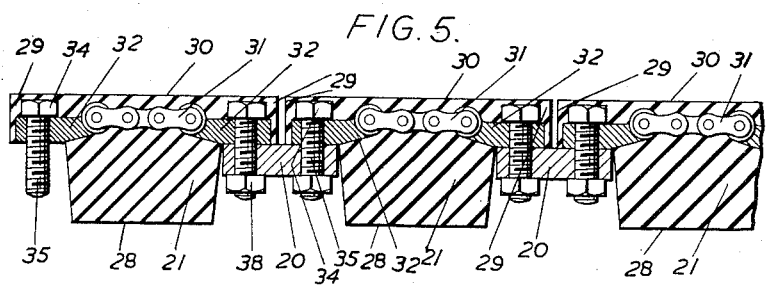
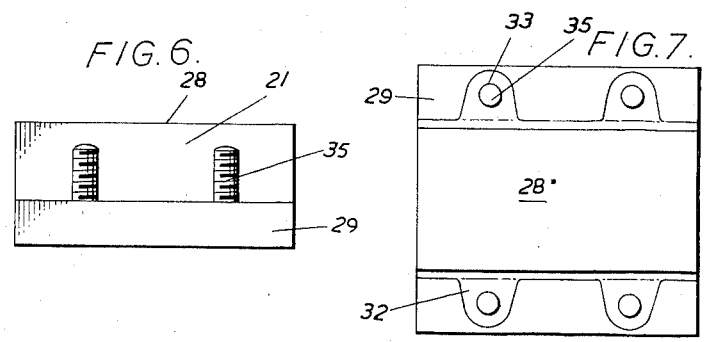
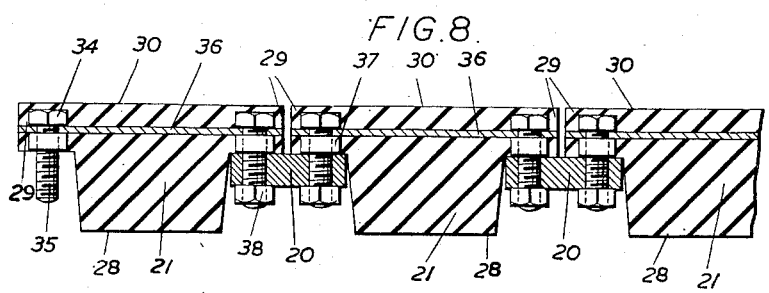
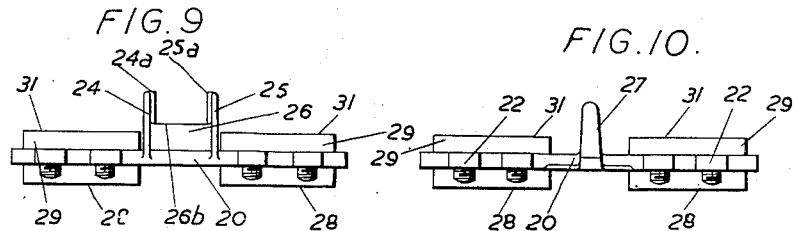

Sept. 4, 1956 R. L. ATKINSON 2,761,745
ENDLESS TRACKS FOR SELF-LAYING TRACK TYPE VEHICLES
Filed Jan. 11, 1954 4 Sheets-Sheet 4

Inventor
Richard Leslie Atkinson

By
Richardson, David and Nordon
his Attorneys

United States Patent Office 2,761,745
Patented Sept. 4, 1956

2,761,745
ENDLESS TRACKS FOR SELF-LAYING TRACK TYPE VEHICLES

Richard L. Atkinson, Brookside, Read, near Burnley, England, assignor to Atkinson's Agricultural Appliances Limited, Clitheroe, England, a British company Application January 11, 1954, Serial No. 403,350

Claims priority, application Great Britain May 29, 1953

6 Claims. (Cl. 305—10)

This invention relates to endless tracks for self-laying track type vehicles.

The track of the present invention is similar to that disclosed in my copending application, Serial 251,702 filed on October 17, 1951, for a Self-Laying Vehicle Track and the present application may be considered to be a continuation-in-part of said earlier application.

Self-laying track type vehicles are being used on an aver-increasing scale both in the domestic and the military fields. In the former field the largest application is in the agricultural industry with vehicles such as tractors, combine harvesters and other machines for carrying out various operations on the land, but there is also considerable use of self-laying track type vehicles in such industries as forestry, building and traction enterprises. In the military field extensive use is made of self-laying track type vehicles such as tanks, half-track vehicles, traction units for hauling heavy equipment such as bridging supplies and heavy guns, and also of smaller scale vehicles particularly adapted for use in land areas unsuitable for fully-wheeled vehicles.

The examples given in the previous paragraph exemplify vehicles which are self-propelled and wherein the tracks are driven by sprockets, but endless tracks also find considerable use in self-laying track type vehicles which are not powered and are adapted to be towed, for example in trailer vehicles or in undercarriages for heavy military equipment such as guns and searchlights. The endless tracks in such constructions are usually termed "dead" tracks and are mounted about friction drums.

The present invention is concerned with both sprocket-driven endless tracks and "dead" tracks.

It has heretofore been proposed to provide an endless track comprising at least two laterally spaced-apart endless rubber bands in which there are embedded endless cables, guiding and driving components and ground shoes being mounted on or from said bands. Tracks of this construction have two fundemental disadvantages in that, firstly, the endless bands and embedded cables stretch in use, more particularly on heavy duty vehicles, and there is no remedy for such stretching, and, secondly, while repair and replacement of broken or damaged guiding and driving components and ground shoes can often be effected, a break in one of the endless rubber bands, and/or a cable or cables embedded therein necessitates complete replacement of the band, a factor which might well be of vital importance in military operations.

Among the objects of the present invention are the provision of endless tracks which will run smoothly, fast and without excessive noise; from which broken and damaged parts can quickly and easily be individually removed and replaced; which are substantially non-stretching when subjected to tension in the longitudinal direction; and which are suitable for running both on roads and across country without inflicting damage to the road surfaces.

According to the present invention there is provided an elongated flexible track which is adapted to be formed into an endless self-laying ground engaging track for the support of a vehicle which is provided with a plurality of guide wheels for load supporting and guiding engagement with the endless track. The track comprises a series of longitudinally spaced tranversely extending rigid track members each having an inner and an outer surface, and parallel transversely extending edges. The track further comprises a series of rectangular blocks each formed of resilient moisture-proof material such as rubber, for example. Each block has a normally flat inner surface and an outer surface of which the end portions are in engagement with two adjacent ones of the track members. The ends of each block are slightly spaced from and substantially abut the ends of adjacent blocks close to the central transverse axes of both rigid track members between which the block extends. In this way, the inner surfaces of the series of blocks form an effectively smooth continuous resilient track surface adapted for load supporting engagement with the guide wheels of the vehicle.

The track of the present invention differs from the track of my copending application Serial No. 251,702 referred to above in that each block comprises a central tread portion which projects outwardly through the space between two adjacent rigid track members and beyond the rigid track members. When a vehicle equipped with a track according to the present invention is traveling along a paved hard-surfaced highway, the destructive engagement between the pavement and the rigid track members which would otherwise occur is prevented by the outwardly projecting central tread portions which maintain the rigid track members resiliently spaced away from the pavement. A quiet and smooth-running engagement between the track and the pavement is thus obtained. The projecting central tread portions of the resilient blocks also provide gripping engagement when traveling over soft ground or similar terrain.

There is embedded within each resilient block at least one flexible and substantially non-extensible tension member which extends longitudinally intermediate the ends of the block. The tension member is connected at its ends to detachable fastening means spaced outwardly of the normally flat inner surface of the block. The fastening means, which are illustratively shown as bolts, connect the end portions of the tension member to the two adjacent rigid track members between which the block extends. This permits any block or any rigid track member to be individually removed from or replaced in the track, while at the same time presenting an effectively smooth and continuous resilient track surface to the load supporting guide wheels of the vehicle.

In one embodiment of the invention, each tension member comprises parallel lengths of roller chain.

In another embodiment of the invention each tension member consists of a normally flat plate formed of flexible spring steel.

In a further embodiment of the invention, the rigid track elements are provided with cleats or grousers and the projecting resilient tread portions are relatively narrow. The cleats assist in the propulsion of the vehicle when traveling over soft ground and the projecting tread portions of the resilient blocks engage the surface of paved roads preventing damage thereto by the cleats.

Ordinarily, the track members are provided with inwardly extending members adapted for engagement with the teeth of a sprocket wheel which drives the vehicle, the series of inwardly extending members forming a flexible chain or rack, according to the configuration of the sprocket wheel.

Various objects, features and advantages of the invention will become apparent upon reading the following specification together with the accompanying drawing forming a part hereof.

Referring to the drawing:

Fig. 3 is a plan view of the inner side of a section of track according to a modified form of the invention.

Fig. 4 is a perspective view of the outer or ground engaging side of the track section of Fig. 3.

Fig. 5 is an enlarged view in vertical longitudinal section taken along the line V—V of Fig. 1.

Fig. 6 is an end view of a resilient block with the ground engaging tread portion at the top and the normally flat inner surface at the bottom.

Fig. 7 is a plan view of the resilient block of Fig. 6, looking at the outer side of the block and at the central resilient tread portion.

Fig. 8 is an enlarged view in vertical longitudinal section, similar to Fig. 5, and showing a modified form of the invention in which a normally flat plate of spring steel serves as the tension member.

Fig. 9 is an end view in elevation of the track section of Fig. 1 looking in the direction of the arrow A.

Fig. 10 is an end view in elevation of the track section of Fig. 3, looking in the direction of the arrow B.

Figure 1:
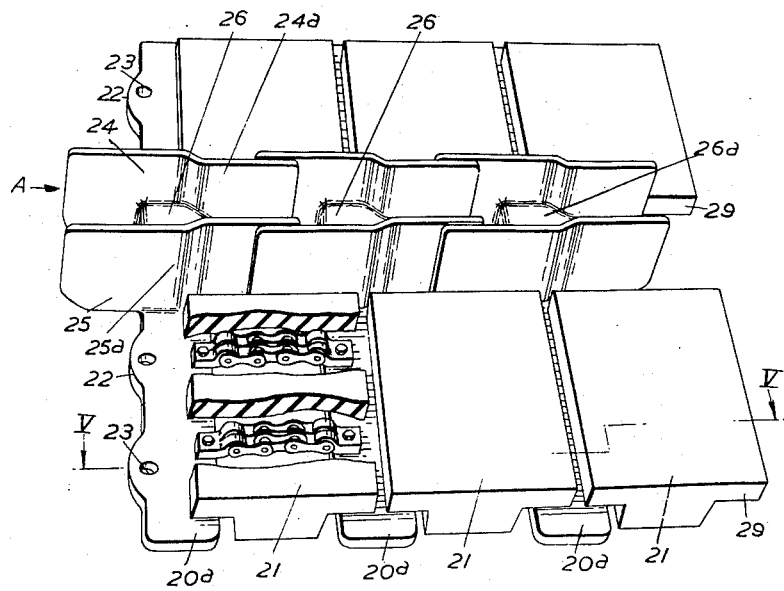
Fig. 1 is a perspective view of a section of track in accordance with the invention, looking at the inner or guide wheel engaging side thereof, portions of one of the resilient blocks being broken away to illustrate details of construction.

Referring now to Figs. 1 to 10 of the drawings, the endless track comprises a plurality of longitudinally spaced transversely-extending rigid metal track elements 20 alternating in the longitudinal direction with and interconnecting in track forming relationship two series of track-element-linking and tread-forming resilient block members 21 in the form of reinforced pads or blocks of rubber or other similar moisture-proof resilient material. The rigid track elements 20 extend transversely across the full width of the track and the two series of resilient blocks 21 are spaced apart transversely and are located one on each side of the track median plane, each rigid track element 20 in the portions thereof intermediate the two rows of resilient blocks being provided with inwardly extending formations or projections adapted to engage the driving sprocket or sprockets of a self-laying track vehicle.

Figs. 1 to 4 and 9 and 10 of the drawings illustrate two types of track element 20 and two types of resilient block members 21, the types in each case being basically similar.

Each rigid track element 20 is generally of rectangular shape in plan view having flat parallel inner and outer surfaces 20a and 20b respectively, and is formed on each side of the track median plane and at both its leading and trailing edges with two transversely-spaced local rounded projections 22 in the region of each of which there is provided in this portion of the rigid track element a circular through opening 23 with its axis normal to the inner and outer surfaces 20a and 20b.

Each track element 20 is provided centrally intermediate its two ends with a drive-sprocket co-operating formation and in a complete track such formations together provide a continuous drive-receiving chain of constant linkage length for the track as is apparent in Figs. 1 to 4.

Figure 2:
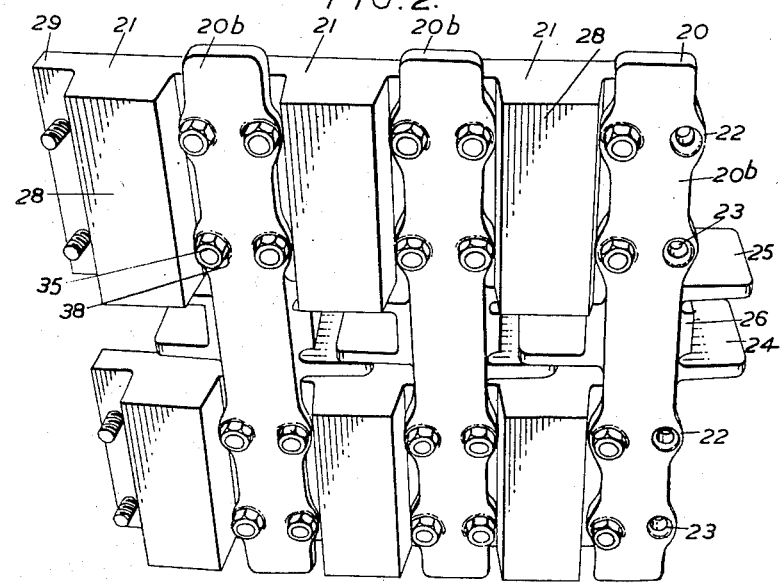
Fig. 2 is a perspective view of the track section of Fig. 1, looking at the outer or ground engaging side thereof.

Referring particularly to Figs. 1, 2 and 9 the drive-sprocket co-operating formation comprises two walls 24 and 25 spaced equal distances from and to each side of the axis centrally intermediate the two ends of the element and extending vertically from the inner surface 20a. The walls 24 and 25 project both fore and aft of the element to an equal extent in both directions and are joggled or offset inwardly towards one another at 24a and 25a respectively centrally along their lengths such that the interval between the outer surfaces of the walls forward of the element is slightly less than the interval between the inner surfaces of the walls to the rear of the element. This permits nesting of the forwardly-projecting parts of the walls 24 and 25 within the rearwardly-projecting parts of the walls 24 and 25 of the element 20 immediately forward thereof in the track and permits also of their mutual free movement relative to one another to enable the track to follow its destined path about the sprockets and guide wheels of a self-laying track vehicle. The space between the walls 24 and 25 is filled up in part by a local deepening of the element 20 at 26. The local deepening extends substantially half the depth or height of the walls 24 and 25 and a little more in both directions than the full fore and aft width of the element 20, being formed at the edge which leads in the track movement with a gentle curving slope 26a to ride easily over the trailing edges of the sprocket teeth and at its trailing edge with an abrupt shoulder 26b to ride easily over the trailing edges of the sprocket teeth and at its trailing edge with an abrupt shoulder 26b to take the thrust of the leading edges of the sprocket teeth.

Referring now particularly to Figs. 3, 4 and 10, the drive sprocket co-operating formation comprises a centrally-disposed tooth 27 of arched formation, the arch extending in the longitudinal direction of the track and projecting both fore and aft of the member 20. The extent of projection of the teeth of adjacent members is such that adjacent teeth edges are slightly spaced one from the other, and the curve of the arches permits an adequate amount of relative turning movement about their axes running transverse of the track of adjacent elements, during movement of the guide wheels and sprockets of a track-laying vehicle over the track inner surface.

It will be manifest that the two types of track element 20 above described are designed for different types of sprocket but as the particular sprocket construction does not come within the scope of the invention illustration thereof and further reference thereto is deemed unnecessary.

Each resilient block member 21 extends between two adjacent rigid track elements 20. The ends of each resilient block 21 are slightly spaced from and substantially abut the ends of adjacent blocks 21 close to the central transverse axes of the two rigid track members 20 between which it extends. Intermediate its ends, each resilient block 21 is provided with an outwardly projecting central tread portion 28, the tread portion 28 being located between two flange portions 29 which engage the inner surfaces 20a of the two rigid track elements 20 between which the tread portion 28 projects. The tread portion 28 projects outwardly beyond the outer surfaces 20b of both rigid track members 20 for engagement with the ground. The flange portions 29 of each resilient block 21 extend in the longitudinal direction of the track for a distance slightly less than half way across each rigid track element 20 so that each flange portion 29 engages and overlies the inner surface 20a of one of the two rigid track elements between which the resilient block 21 extends. Each resilient block comprises a normally flat inner surface 30 which is flexed as the track passes over the sprocket wheels of the vehicle. The ends of the flange portions 29 are slightly spaced from and substantially abut the ends of adjacent blocks close to the central transverse axes of the two rigid track elements 20 between which it extends so that the inner surfaces 30 of the series of resilient blocks 21 form an effectively smooth continuous resilient track surface adapted for load supporting engagement with the guide wheels of the vehicle.

Embedded within each resilient block 21 substantially midway of the depth of the flange portions 29 is a flexible substantially non-extensible tension member or a plurality of such tension members.

Figure 11:
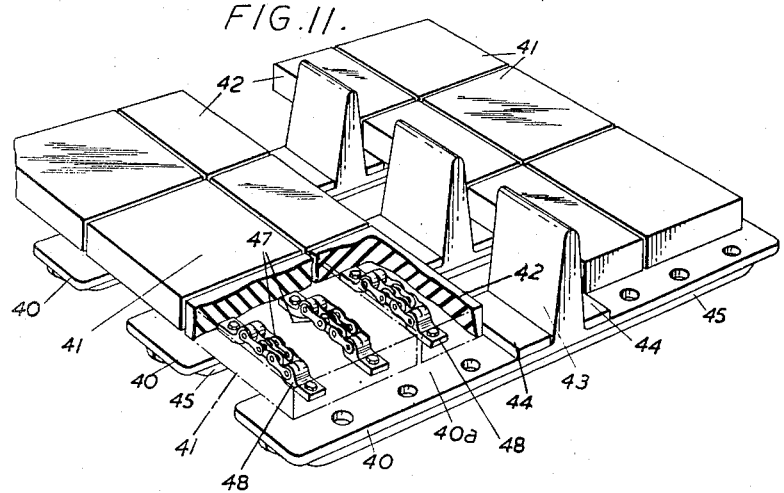
Fig. 11 is a perspective view of a section of track in accordance with a further modified form of the invention, looking at the inner or guide wheel engaging side thereof, portions of two resilient blocks being broken away to illustrate details of construction.

As shown in Figs. 1, 5 and 11, each tension member may consist of a length of double width roller chain. As shown in Fig. 8, the tension member may consist of a flexible plate formed of spring steel spaced from the inner surface 30 of the block and laterally coterminous with the sides of the block.

The lengths of chain are exactly similar and are spaced apart transversely (see Fig. 1), being symmetrically disposed on each side of the central longitudinal axis of the resilient block 21 to preserve the balance of the resilient block member and distribute its tensile strength substantially uniformly across its width. Each metal connecting block 32 has an opening 33 corresponding in diameter to the openings 23 in the track elements and is formed at its inner side adjacent the inner surface 30 of the resilient block member with a seating for the head 34 of a bolt the screwthreaded shank 35 of which extends from within the block and projects outwardly therebeyond. The lengths of roller chain, the connectors, and the heads of the bolts are all embedded in and bonded to the rubber of the block members 21 by one of the known processes for bonding rubber to metal.

From the foregoing, it will be seen that each of the lengths of roller chain 31 is flexible about a plurality of bending axes which are parallel to the edges of the rigid track members 20 which are interconnected by the chain. The detachable fastening means comprising the bolt heads 34 as well as the chains 31 are spaced outwardly from the inner surface 30 of each resilient block member so that metal to metal contact between the guide wheels of the vehicle and the tension members or the bolts is prevented. The resiliency of the effectively smooth and continuous track surface formed by the inner surfaces 30 of the series of resilient blocks is thus retained, while at the same time each resilient block together with its embedded tension members may be removed from the endless track or replaced therein as a unit.

Referring now to Fig. 8 of the drawings, the tension member embedded in each resilient block 21 comprises a flexible plate 36 of spring steel about which the resilient block member is moulded and the periphery of which is substantially coterminous with the lateral periphery of the resilient block including the flanges 29. Openings are provided in the plate for the shanks 35 of the bolts and the heads 34 of the bolts are welded or otherwise secured to the plate. A spacing member 37 is provided on each bolt shank 35 on the opposite side of the plate from the head 34 of the bolt and is also welded or otherwise secured to the plate. In moulding the rubber of the member 21 about the plate, bolt head and spacing washer, the rubber is bonded to the metal by one of the known processes for this purpose.

In coupling up the track the shanks 35 of the bolts are passed through the openings 23 in the track elements and are engaged and locked in position by nuts 38.

A broken or damaged part is easily and speedily removed and replaced by removing the nuts 38 from the shanks 35. The embedded tension members formed by the roller chains or steel plates prevent longitudinal stretch or excessive distortion of the rubber of the blocks 21 while allowing the latter to flex to the required degree. The flexible tension members are protected by the rubber against damage and deterioration by rust.

The adjacent edges of the flanges 29 of adjacent resilient blocks 21 in the track are disposed very close to and substantially abutting one another in the track and the two series thereof provide two parallel and effectively continuous running tracks for the guide wheels of a self-laying track type vehicle, these tracks being shock-absorbing and facilitating smooth and fast running of the vehicle and with much less noise than has hitherto been associated with the operation of such vehicles.

It will be clear that a single series of resilient blocks 21 may be provided in a "dead" or idler track construction, the resilient blocks extending substantially the full width of the track and the drive-sprocket co-operating formations being omitted from the rigid track elements.

It will be evident, moreover, that the ground pressure exerted by a self-laying track type vehicle fitted with endless tracks according to the invention through the guide wheels running on the running tracks is distributed over more than one track element 20 owing to the association of the resilient blocks 21 with the track elements, each member bridging two adjacent elements. As a result the maximum pressure per unit of ground area is reduced.

Vehicles equipped with tracks of the present invention can travel equally well over paved road surfaces and soft ground. The road surfaces are not damaged as they are contacted only by the rubber tread surfaces 28 of the blocks 21, whereas on soft ground the track elements 20 function as grousers. Over soft ground there is a reduction in maximum ground pressure and more equitable distribution of the weight of the vehicle, and furthermore the resilient blocks 21 function to prevent or mitigate lateral slip of the vehicle.

Figure 12:
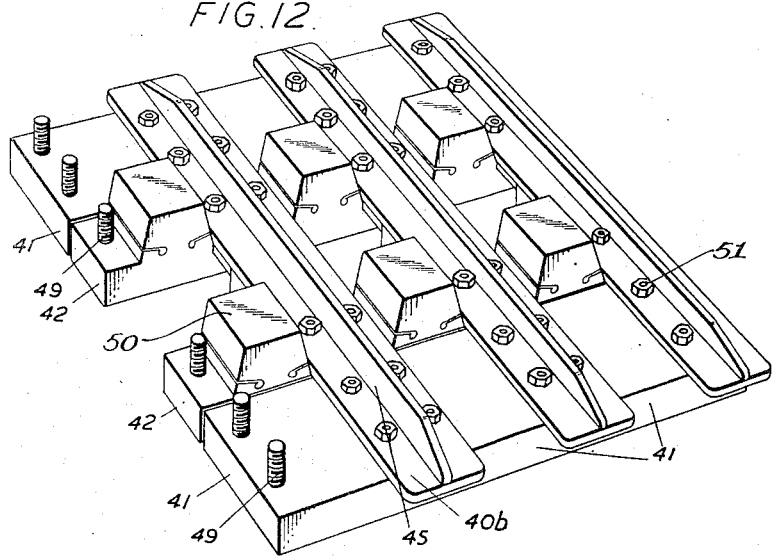
Fig. 12 is a perspective view looking at the outer or ground engaging side of the track section of Fig. 11.

Referring now to Figs. 11 and 12 the section of endless track comprises a plurality of transversely-extending rigid metal track elements 40 alternating in the longitudinal direction with and interconnecting two series of pairs of resilient blocks 41 and 42. The rigid track elements 40 extend the full width of the track and the two series of pairs of pads are spaced apart transversely and are located opposite sides of the track median plane, each track element in the central portion thereof between the pairs of pads being provided with formations adapted to engage the driving sprocket or sprockets of a self-laying track vehicle.

Each track element 40 is generally rectangular in plan view and is provided on its inner surface 40a centrally intermediate its two ends with an inwardly-projecting guide or tooth 43 adapted to co-operate with the teeth of an appropriately-designed sprocket. A rectangular spacer element 44 is mounted on the surface 40a on each side of the tooth 43 to space therefrom the adjacent faces of the inside pads 42 of each series.

A grouser 45 is provided on the outer or ground-facing surface 40b of each track element 40. The grousers 45 extend the full lengths of the rigid track elements, i. e. transversely of the track, and are of blade formation, being centrally located and tapering divergently inwards towards the surfaces 40b at both ends.

Twelve through openings 46 which serve as bolt holes are provided in each track element, being provided in groups of three on each side of the tooth 43 fore and aft of the grouser 45.

The resilient blocks 41 and 42 are arranged symmetrically in two rows. The blocks 41 of the outer rows are approximately twice as wide as the blocks 42 of the inner rows, the inner rows being adjacent to the spacer elements 44. The blocks 41 and 42 of the outer and inner rows are of the same length and are also of the same thickness in the end portions thereof which overlie and engage the inner surfaces 40a of the rigid track elements 40.

Embedded in the resilient blocks 41 of the outer row there are two short lengths of double width roller chain 47 constituting flexible and substantially inextensible tension members which interconnect adjacent ones of the rigid track elements 40. The opposite ends of each of the lengths of roller chain 47 terminate in connecting blocks 48 as described above with regard to the blocks 32 shown in Fig. 5. As in the case of the resilient blocks 21 shown in Figs. 1 to 5, detachable fastening means are provided for securing the tension members 47 to the rigid track elements 40, bolts being provided for this purpose which extend outwardly from within each resilient block and having threaded shank portions 49 which protrude beyond the resilient block 41 and through the openings or bolt holes 46 in the rigid track elements 40.

In the example illustrated in Figs. 11 and 12 of the drawing, the inner blocks 42, which are approximately one-half the width of the outer blocks 41, have embedded therein only a single length of roller chain 47. Whereas the outer surfaces of the outer row of resilient blocks 41 are smooth and are not provided with any ground engaging tread portions, the inner blocks 42 are formed with central tread portion 50 which project outwardly beyond the cleats or grousers 45 for resilient engagement with the surface of a paved highway. The tread projections 50 extend across the full width of each of the narrow inner blocks 42. The flange portions, like the flange portions 29 shown in Figs. 1 to 5 extend longitudinally of the track for a distance slightly less than one-half of the distance across each of the two rigid track elements 40 between which each resilient block 42 extends. The fore and aft sides of each tread projection 50 are shown tapering slightly and convergently outwardly toward the ground engaging end thereof.

When the track is assembled, the adjacent edges of the resilient blocks of each series are disposed very close to one another and the inner surfaces thereof provide together an effectively smooth and continuous surface both in the transverse and the longitudinal directions of the track. In the assembled track the inside edges of the inner row of narrow resilient blocks 42 abut the spacer elements 44 and the shanks 49 of the bolts project downwardly through the openings 46 and are locked in the assembled position by nuts 51. The track shown in and described with reference to Figs. 11 and 12 of the drawings provides the same advantageous features as the tracks shown in and described with reference to Figs. 1 to 10, and in addition the construction allows for the replacement of an individual resilient block of narrow width instead of a full width block. Moreover, tracks of various widths can be built up using combinations of component blocks together with appropriately-designed track elements.

The track projections 50 of the inside blocks 42 only engage the ground when the going is firm as on paved road surfaces but over soft ground the grousers 45 also engage the ground and assist considerably in providing traction for the propulsion of the vehicle, the projections 50 in this event serving to obviate or mitigate lateral slip of the vehicle.

The tracks hereinbefore described are substantially non-stretching and inextensible in the longitudinal direction and this feature ensures that the pitch of the drive-sprocket co-operating formations is constant and provides proper meshing engagement for the endless track with the drive sprockets of the vehicle.

I claim:

1. An elongated flexible track adapted to be formed into an endless self-laying ground engaging track for the support of a vehicle having a plurality of longitudinally spaced guide wheels for load supporting and guiding engagement with said track, said track comprising: a series of spaced transversely extending rigid track members each having inner and outer surfaces and parallel longitudinally spaced adjacent transversely extending edges; a series of aligned rectangular blocks each formed of tough, resilient moisture-proof material and each having a normally flat inner surface and an outer surface, said outer block surfaces being engaged by said inner track member surfaces, each of said blocks extending between two adjacent ones of said track members with its ends slightly spaced from and substantially abutting the ends of adjacent blocks close to the central transverse axes of both track members between which it extends, whereby the inner surfaces of said series of blocks form an effectively smooth continuous resilient track surface adapted for load supporting engagement with said guide wheels, each of said blocks comprising an outwardly extending central tread portion which protrudes beyond said track members between which said block extends and through the space therebetween for resilient engagement with the ground; a flexible substantially non-extensible tension member embedded in each block and extending longitudinally thereof intermediate the ends of said block; and a plurality of detachable fastening means spaced outwardly of said normally flat inner surface of each block and extending outwardly from within said block and from opposite end portions of each tension member, said fastening means connecting said end portions of said tension member to said two adjacent track members between which said block extends, whereby any of said track members or said blocks may be individually removed from said track and replaced therein.

2. A track according to claim 1, wherein said track members comprise portions which extend inwardly and form a series of teeth adapted for meshing engagement with a power operated sprocket wheel of said vehicle, said series of teeth being arranged along the central longitudinal axis of said track, and in which said series of blocks is arranged in two parallel rows laterally disposed on opposite sides of said series of teeth to provide a pair of symmetrically arranged resilient track surfaces for load supporting engagement with said guide wheels.

3. A track according to claim 2, further comprising at least two parallel rows of additional aligned rectangular blocks disposed on opposite sides of said series of teeth symmetrically both with respect to said series of teeth and with respect to said first-named parallel rows of blocks, each of said additional blocks being formed of tough, resilient moisture-proof material and having a normally flat inner surface and an outer surface, said outer surfaces of said additional blocks being engaged by said inner track member surfaces, each of said additional blocks extending between two adjacent ones of said track members and having a longitudinally extending lateral edge portion disposed in close proximity to a lateral edge portion of a block of one of said first-named parallel rows of blocks, each of said additional blocks having its ends slightly spaced from and substantially abutting the ends of other adjacent additional blocks close to the central transverse axes of both track members between which it extends, said inner surfaces of all of said blocks together forming an effectively smooth continuous resilient track surface adapted for load supporting engagement with said guide wheels; a flexible substantially non-extensible tension member embedded in each of said additional blocks and extending longitudinally thereof intermediate the ends of said additional block; and a plurality of detachable fastening means spaced outwardly of said normally flat inner surface of each additional block and extending outwardly from within said additional block and from opposite end portions of each tension member, said fastening means connecting end portions of said tension member to said two adjacent track members between which said additional block extends, whereby any of said additional blocks may be individually removed from said track and replaced therein.

4. A track according to claim 1, wherein said tension member comprises at least one length of roller chain flexible about a plurality of bending axes parallel to said track member edges.

5. A track according to claim 1, wherein said tension member comprises a normally flat plate formed of flexible spring steel extending parallel to and spaced outwardly from said normally flat inner surface of the block within which it is embedded.

6. A track according to claim 1, wherein said fastening means comprises a plurality of bolts, each bolt having a head portion embedded in said resilient block and a threaded shank portion which extends through one of said two adjacent track members, said fastening means further comprising a nut threaded on said shank portion and securing said bolt to said one of said two track members.

References Cited in the file of this patent
UNITED STATES PATENTS

| | | |
|---|---|---|
| 1,542,149 | Landry | June 16, 1925 |
| 1,666,037 | Wine et al. | Apr. 10, 1928 |
| 2,338,550 | Sloman et al. | Jan. 4, 1944 |
| 2,416,679 | Curtis | Mar. 4, 1947 |
| 2,449,421 | Slemmons et al. | Sept. 14, 1948 |